UNITED STATES PATENT OFFICE.

DU BOIS D. PARMELEE, OF NEW YORK, N. Y.

IMPROVEMENT IN VULCANIZING CAOUTCHOUC.

Specification forming part of Letters Patent No. 24,401, dated June 14, 1859.

*To all whom it may concern:*

Be it known that I, DU BOIS D. PARMELEE, of New York, in the county and State of New York, have invented certain new and useful Improvements in Treating India-Rubber and other Vulcanizable Gums, either separately or combined; and I hereby declare that the following is a full, clear, and exact description of the same.

My improvements relate to a mode or system of vulcanizing india-rubber or gutta-pecha, or both india-rubber and gutta-percha, combined or mixed with other gummy substances of a similar nature, where no heat is employed, in contradistinction to a mode described in Charles Goodyear's patent bearing date of June 15, 1844, where heat is the principal agent to effect said vulcanization.

A process requiring no heat and consisting in the employment of a solution of chloride of sulphur in bisulphuret of carbon or pure coal-naphtha cold, wherein the rubber sheets are immersed for producing in them nearly the same effects and properties possessed by rubber vulcanized by heat, has previously been used and known under the name of "Parkes' converting process;" but this mode has never been successfully introduced in the arts, and was altogether abandoned on account of the expense in the preparation of the chemicals, the dangers to health and life in the employment of such chemicals, and the limited use to which the process could be practically applied.

In my application for Letters Patent filed previous to this, I have described a process which is an improvement on Parkes' process of converting india-rubber, whereby certain new and useful results are obtained, rendering the employment of that process practically useful by reducing the expense in the preparation of chemicals, by establishing comparative safety in the employment of said chemicals, and by enlarging its application generally, as fully set forth in my specification accompanying said application. In that improved method of vulcanizing india-rubber it is necessary to make some experimenting to ascertain the requisite strength of the solution and the time of immersion in order to get the proper degree of vulcanization, which experimenting requires both skill and judgment not usually possessed by workmen to whom this class of work is ordinarily confided.

My present improvement has for its object the preparation of a solution more readily obtained, requiring little or no experimenting, and being more effectual in operation, by the immersion of the rubber, in which the change or "hermizing" effect as I term it, is produced.

To enable others skilled in the arts to make and use my improvement, I shall now proceed to describe the manner in which the same is carried into effect.

I take caoutchouc or gutta-percha, or their compounds, masticated and mixed with sulphur according to any convenient method known or practiced heretofore, and after shaping the same into any desired form, I immerse it into a solution, either of coal-naphtha, bisulphuret of carbon, chloroform, or sulphric ether saturated with bromine. The solution I prepare by pouring liquid bromine into either of the named ingredients until it assumes a fine red color resembling claret wine or even darker, according to thickness and form of the articles or the nature of the compound of which the said articles are made. The time I allow the articles to remain immersed in the solution also varies according to the thickness or substance of the article; but I find for general purposes a sheet of one-sixteenth of an inch in thickness is sufficiently hermized in from fifteen to thirty seconds. A prolonged immersion will produce the hardening of the rubber.

Having described the method by which I treat caoutchouc or gutta-percha, or their compounds when these substances are blended with sulphur, I would here observe that this my improvement is also applicable to the treatment of articles made of rubber or other vulcanizable gum having no sulphur blended or mixed therewith. When, therefore, it is desirable to produce the change or hermizing effect in articles made of raw rubber or of other raw gums of similar nature I operate as follows: I pass the raw caoutchouc and gutta-percha, or either of them, separately, or combined with or without other gums, between rollers, until perfectly masticated and a more or less uniform sheet is obtained. I then fashion it into any desired form or shape, and immerse the same in a solution composed of either coal-naphtha, bisulphide of carbon, chloroform, or sulphuric ether, and sulphur and liquid bromine. Although the reactions and effects produced are similar to those produced by the former mode, it may be advantageous in some cases to employ this mode in preference to the former, particularly when operating on thicker sheets requiring to be tough.

I also sometimes mix the sulphur and bromine separately, and thus form a solution of the former in the latter. Into this I then pour either of the above-named solvents of caoutchouc. I have also found it convenient to mix some of these liquids and to employ them together. For example, coal-naphtha and bisulphide of carbon may be mixed in equal proportions, and then the solution of sulphur in bromine poured into this.

The articles made of raw rubber, immersed into this solution, are changed in the same manner as though either coal-naphtha or bisulphide of carbon had been employed separately.

The following I recommend as proportions of these ingredients and method of preparing the solutions: take ten pounds of either coal-naphtha, bisulphide of carbon, chloroform, or sulphuric ether, and into either of these liquids dissolve about one pound of sulphur (preferably roll sulphur broken into small pieces.) Then into this solution so made pour one ounce liquid bromine.

I do not, however, confine myself to these proportions of ingredients, as changes may be made without affecting the principle of my invention; but

What I claim as my invention, and desire to secure by Letters Patent, is—

The preparation and use of the ingredients herein described with bromine, whether combined or not with sulphur, substantially as herein described, and for the purposes set forth.

In testimony whereof I have signed my name to this specification before two subscribing witnesses.

DU BOIS D. PARMELEE.

Witnesses:
  A. POLLAK,
  EDM. F. BROWN.